United States Patent Office 3,380,891
Patented Apr. 30, 1968

3,380,891
PROCESS OF PURIFYING GLUCOAMYLASE
Julian Corman, Muscatine, Iowa, assignor to Grain Processing Corporation, Muscatine, Iowa, a corporation of Iowa
No Drawing. Filed July 31, 1964, Ser. No. 386,757
18 Claims. (Cl. 195—31)

This invention relates to the treatment of starch hydrolyzing enzyme preparations and to an improved enzymatic process for the production of hydrolyzates of starch and starch products having exceptionally high dextrose content.

Although the presence of starch hydrolyzing enzymes is widespread within the plant and animal kingdom, sources of microbiological origin are used most commonly in industry in the enzymatic saccharification of liquefied starch to form dextrose-containing syrups. The culture filtrates of Aspergillus phoenicis, Aspergillus diastaticus, Aspergillus usamii and Aspergillus niger produce excellent enzyme systems which hydrolyze liquefied starch to dextrose. Cultures of Aspergillus niger are particularly advantageous.

The broth resulting from the fermentation of these organisms generally contains several enzymes having different activities, some of which interfere with the production of dextrose when the enzyme preparation is employed to hydrolyze starch. Thus, for example, in the culture broth of Aspergillus niger three predominant enzyme systems have been identified, namely, alpha-amylase, glucoamylase (amyloglucosidase) and transglucosidase. Alpha-amylase attacks gelatinized starch by a random splitting of the starch molecule which reduces the molecular size appreciably and thus causes a desirable reduction in viscosity of the dispersion. This dispersion contains a linear fraction from amylose of polymerized dextrose attached in the alpha-1,4-positions and a branched polymer from amylopectin which also contains alpha-1,4-linkages, but in addition has branched positions adjoining with alpha-1,6-linkages.

In contrast to the multi-chain action of alpha-amylase, the action of glucoamylase is thought to be a "single-chain" action where an enzyme molecule attaches to the dextrin and splits off one glucose unit at a time and thus can theoretically convert it quantitatively to dextrose. The action of gluocoamylase on dextrin polymers is much more specific at the alpha-1,4-gluocosidic bonds than the alpha-1,6-gluocosidic bonds in that it will cleave the former type bond approximately 30 times as fast as the latter type bond. One unit of glucoamylase saccharifies soluble starch at a rate equivalent to one gram dextrose per hour at 60° C. and pH 4.3 providing not more than 25 percent of the substrate is saccharified.

The presence of transglucosidase with glucoamylase in enzyme preparations detracts from the potential yield of dextrose in the hydrolyzate. Transglucosidase is known to catalyze transglucosylation reactions between dextrose, maltose and other intermediate saccharified products. As a result, upon completion of the saccharification reaction saccharides other than dextrose are still present in substantial amounts.

Accordingly, it is highly desirable to treat glucoamylase-containing fungal enzyme preparations to substantially inactivate the enzymes, principally transglucosidase, which in the hydrolysis of starch interfere with the formation of dextrose.

The present invention provides a process for purifying glucoamylase-containing fungal enzyme preparations to inactivate enzymes which in the hydrolyzation of starchy materials interfere with the production of dextrose. The present invention also provides a process for hydrolyzing starch to obtain high yields of dextrose by subjecting a liquefied starchy material to the action of a purified glucoamylase-containing fungal enzyme preparation.

In accordance with the present invention a glucoamylase-containing fungal enzyme preparation is purified by treatment with a treating agent selected from the group consisting of magnesium lauryl sulfate, dioctyl sodium sulfosuccinate, sodium oleyl methyltauride, sodium lauryl isethionate, and the free acids thereof. While the use of these treating agents for the disclosed purpose is novel, the treating agents themselves are known and can be prepared, for example, by methods disclosed in chapter 2 of Surface Active Agents and Detergents, volume II, A. M. Schwartz, J. W. Perry and J. Berch, 1958 edition, Interscience Publishers, Inc. and pp. 422 and 423 of Organic Chemistry, L. F. Fieser and M. Fieser, 2nd edition, 1950, D. C. Heath and Company.

Briefly, dioctyl sodium sulfosuccinate is prepared by esterifying maleic anhydride with octyl alcohol and sodium bisulfate is added across the double bond. Sodium oleyl methyltauride is prepared from oleylchloride. The oleylchloride is first prepared by reacting oleic acid with phosphorus trichloride at 50° to 52° C. with agitation for 6 hours. The oleylchloride is reacted with N-methyltaurine (25–30% aqueous solution) and sodium hydroxide at 22°–40° C. Magnesium lauryl sulfate is prepared by heating lauryl alcohol in the presence of a slight excess of sulfamic acid at about 140° C. The reaction is catalyzed by amides such as dicyandiamide, urea and ammonium sulfamate so that the reaction can be conducted at 115° C. The magnesium salt can then be formed from the ammonium lauryl sulfate. Lauryl alcohol can be added together with sulfur trioxide in liquid sulfur dioxide to give lauryl sulfate from which the various salts can be formed. The sodium lauryl isethionate is prepared by esterifying lauric acid with isethionic acid and neutralizing with sodium hydroxide.

In practicing the present invention the fungal enzyme preparation is generally treated in the form of an aqueous solution and the treating agents intimately dispersed therein. The treatment can be effected at a pH ranging from about 1.5 to 4.0, preferably 2.0 to 4.0, and a temperature from about 5 to 50° C., preferably 15 to 40° C., for a period of time sufficient to substantially inactivate the transglucosidase. In general, treating periods of about 5 minutes or longer are satisfactory. The treating agents are employed in an amount ranging from about 0.01 to 0.5% by weight of the aqueous glucoamylase preparation. After treatment for a period of time sufficient to substantially inactivate the transglucosidase, the fungal enzyme solution can be filtered or centrifuged to remove undissolved solids therefrom with the desired glucoamylase remaining in the filtrate. This step is not necessary, however, since the desired inactivation of transglucosidase occurs without precipitation of insoluble solids.

One specific preferred embodiment of the process of the invention is carried out as follows: A glucoamylase-containing fungal enzyme culture filtrate, either with mycelium present or after being filtered to remove mycelium, is adjusted to a pH of about 2.5. The temperature of the enzyme liquor is maintained at about 30° C. and the aqueous filtrate agitated for a period of about 60 minutes with sodium oleyl methyltauride. After the 60 minute agitation period, the solution is filtered. The treated glucoamylase preparation (filtrate), substantially devoid of transglucosidase activity, can be used for starch conversion in this form or it can be concentrated or it can be precipitated by means of a precipitating agent such as alcohol to obtain the glucoamylase enzyme in dry form.

The process of the invention is applicable to the purification of glucoamylase-containing fungal enzyme preparations to inactivate transglucosidase which may be present therein. Accordingly, glucoamylase-containing culture filtrates of *Aspergillus phoenicis, Aspergillus diastaticus, Aspergillus usamii* and *Aspergillus niger* can be advantageously treated by the process of the invention. The process is applicable to crude glucoamylase solutions and to such solutions which have undergone preliminary purification.

Several procedures can be employed to evaluate the effectiveness of the purification treatment. The ultimate test is, of course, the ability of the treated enzyme preparation to hydrolyze starch to produce hydrolyzates having high dextrose contents such as dextrose equivalents of 94 to 98 and above. Methods for determining glucoamylase activity and transglucosidate activity are described in U.S. Patent No. 3,042,584 to Kooi et al.

The following specific examples further illustrate the present invention and the advantages thereof.

Example I

Twenty milliliter aliquots of filtrate from an *Aspergillus niger* liquid culture were adjusted to pH 2.5 and several concentrations (weight basis) of dioctyl sodium sulfosuccinate and magnesium lauryl sulfate added to individual aliquots. One aliquot, the control, contained no treating agent. The solutions were agitated at 30° C. for one hour and then centrifuged. The supernatants were adjusted to pH 4.0 and diluted to 25 milliliters. Glucoamylase determinations were made to establish enzyme recovery and the enzymes were evaluated in the following starch hydrolysis procedure: One hundred gram aliquots of enzymatically liquefied corn starch at 30% solids were weighed into 250 milliliter flasks and glucoamylase enzyme added at a level of one glucoamylase unit per 6 grams of starch. The flasks containing the starch-enzyme mixtures were shaken at 60° C. for 72 hours at which time dextrose equivalent (D.E.) determinations were made on the hydrolyzate using the sugar determination method described by Somogyi (J. Biol. Chem., 160, 61–68 (1945)). The results were as follows:

| Treating agent | Concentration, percent (Wt./wt. of preparation) | Glucoamylase recovery, percent | D.E. at 72 hours |
|---|---|---|---|
| None | | 100 | 93.4 |
| Dioctyl sodium sulfosuccinate | 0.05 | 87.6 | 96.0 |
| | 0.10 | 86.4 | 97.1 |
| | 0.20 | 90.0 | 98.3 |
| Magnesium lauryl sulfate | 0.10 | 85.7 | 97.2 |
| | 0.20 | 73.0 | 95.5 |

Example II

In order to illustrate the effect of time, barium acetate (which forms a precipitate with dioctyl sodium sulfosuccinic acid) was added to enzyme-dioctyl sodium sulfosuccinate mixtures prepared as in Example I with 0.1% of the treating agent. The barium acetate was added at a level of 1.0% after 5, 15, 30, 45 and 60 minutes. The mixtures were then centrifuged and the supernatants adjusted to pH 4.0. Glucoamylase determinations were made to establish enzyme recoveries and the supernatants were then used to saccharify enzymatically liquefied 30% solids corn starch as in Example I. In this case the starch hydrolysis was conducted for 96 hours. The results are shown below:

| | Glucoamylase recovery, percent | D.E. at 96 hours |
|---|---|---|
| Time barium salt added, min.: | | |
| 5 | 91.1 | 94.3 |
| 15 | 95.9 | 96.4 |
| 30 | 94.6 | 96.3 |
| 45 | 94.6 | 96.3 |
| 60 | 93.8 | 96.5 |
| No treatment | 100 | 93.9 |

The results indicate that a treating period as short as 5 minutes resulted in purification of the enzyme preparation.

Example III

Runs similar to Example I were made with the exception that 0.1% of sodium oleyl methyltauride and of sodium lauryl isethionate were employed. The saccharification test was terminated at 48 hours with the following results:

| Treating agent | Glucoamylase recovery, percent | D.E. at 48 hours |
|---|---|---|
| None | 100 | 93.2 |
| 0.1% Sodium lauryl isethionate | 46.1 | 96.9 |
| 0.1% Sodium oleyl methyltauride | 64.8 | 96.0 |

Those modifications and equivalents which fall within the spirit of the invention and the scope of the appended claims are to be considered part of the invention.

I claim:

1. A process of purifying a transglucosidase and glucoamylase-containing fungal enzyme preparation which comprises treating said preparation in aqueous medium at a pH of from about 1.5 to 4.0 with a treating agent selected from the group consisting of magnesium lauryl sulfate, dioctyl sodium sulfosuccinate, sodium oleyl methyltauride, sodium lauryl isethionate, and the free acids thereof for a time sufficient to substantially inactivate the transglucosidase enzyme.

2. The process of claim 1 wherein the treatment is carried out for a period of at least about 5 minutes.

3. The process of claim 1 wherein the transglucosidase and glucoamylase-containing fungal enzyme preparation is derived from the Aspergillus genus.

4. The process of claim 1 wherein the transglucosidase and glucoamylase-containing fungal enzyme preparation is derived from *Aspergillus niger*.

5. The process of claim 1 wherein treatment is carried out at a temperature between about 5 and 50° C.

6. The process of claim 1 wherein the treatment is carried out at a temperature between about 15 and 40° C.

7. A process of purifying a transglucosidase and glucoamylase-containing fungal enzyme preparation which comprises treating said preparation in aqueous medium at a pH of from about 1.5 to 4.0 with magnesium lauryl sulfate for a time sufficient to substantially inactivate the transglucosidase enzyme.

8. A process of purifying a transglucosidase and glucoamylase-containing fungal enzyme preparation which comprises treating said preparation in aqueous medium at a pH of from about 1.5 to 4.0 with dioctyl sodium sulfosuccinate for a time sufficient to substantially inactivate the transglucosidase enzyme.

9. A process of purifying a transglucosidase and glucoamylase-containing fungal enzyme preparation which comprises treating said preparation in aqueous medium at a pH of from about 1.5 to 4.0 with sodium oleyl methyltauride for a time sufficient to substantially inactivate the transglucosidase enzyme.

10. A process of purifying a transglucosidase and glucoamylase-containing fungal enzyme preparation which comprises treating said preparation in aqueous medium at a pH of from about 1.5 to 4.0 with sodium lauryl isethionate for a time sufficient to substantially inactivate the transglucosidase enzyme.

11. A process of treating a transglucosidase and glucoamylase-containing fungal enzyme preparation which comprises contacting said preparation in aqueous medium with a treating agent selected from the group consisting of magnesium lauryl sulfate, dioctyl sodium sulfosuccinate, sodium oleyl methyltauride, sodium lauryl isethionate, and the free acids thereof at a temperature between about 5 and 50° C. and at a pH of from 1.5 to 4.0 for a time sufficient to substantially inactivate the transglucosidase enzyme, and then separating purified glucoamylase enzymes from said preparation.

12. The process of claim 11 wherein the treating agent is employed in an amount from about 0.01 to 0.5% by weight of the fungal enzyme preparation.

13. The process of claim 11 wherein treatment is carried out at a temperature from about 15 to 40° C.

14. In a process for producing dextrose from starchy materials wherein the starchy material is hydrolyzed with fungal enzymes, the improvement which consists in hydrolyzing the starchy material with a glucoamylase-containing fungal enzyme preparation which has been purified by treating said preparation in aqueous medium at a pH of from about 1.5 to 4.0 with a treating agent selected from the group consisting of magnesium lauryl sulfate, dioctyl sodium sulfosuccinate, sodium oleyl methyltauride, sodium lauryl isethionate and the free acids thereof for a period of time sufficient to substantially inactivate the transglucosidase enzyme.

15. In a process for producing dextrose from starchy materials wherein the starchy material is hydrolyzed with fungal enzymes, the improvement which consists in hydrolyzing the starchy material with a glucoamylase-containing fungal enzyme preparation which has been purified by treating said preparation in aqueous medium at a pH of from about 1.5 to 4.0 with magnesium lauryl sulfate for a period of time sufficient to substantially inactivate the transglucosidase enzyme.

16. In a process for producing dextrose from starchy materials wherein the starchy material is hydrolyzed with fungal enzymes, the improvement which consists in hydrolyzing the starchy material with a glucoamylase-containing fungal enzyme preparation which has been purified by treating said preparation in aqueous medium at a pH of from about 1.5 to 4.0 with dioctyl sodium sulfosuccinate for a period of time sufficient to substantially inactivate the transglucosidase enzyme.

17. In a process for producing dextrose from starchy materials wherein the starchy material is hydrolyzed with fungal enzymes, the improvement which consists in hydrolyzing the starchy material with a glucoamylase-containing fungal enzyme preparation which has been purified by treating said preparation in aqueous medium at a pH of from about 1.5 to 4.0 with sodium oleyl methyltauride for a period of time sufficient to substantially inactivate the transglucosidase enzyme.

18. In a process for producing dextrose from starchy materials wherein the starchy material is hydrolyzed with fungal enzymes, the improvement which consists in hydrolyzing the starchy material with a glucoamylase-containing fungal enzyme preparation which has been purified by treating said preparation in aqueous medium at a pH of from about 1.5 to 4.0 with sodium lauryl isethionate for a period of time sufficient to substantially inactivate the transglucosidase enzyme.

References Cited
UNITED STATES PATENTS 3,117,063  1/1964  Hurst et al. _____ 195—31

LIONEL M. SHAPIRO, *Primary Examiner.*

A. LOUIS MONACELL, *Examiner.*